United States Patent [19]

Azuma et al.

[11] Patent Number: 4,626,964
[45] Date of Patent: Dec. 2, 1986

[54] ELECTRICAL DOUBLE LAYER CAPACITOR AND PRODUCTION OF THE SAME

[75] Inventors: Siro Azuma; Kenichi Yokoyama; Tatsuya Kitai, all of Osaka, Japan

[73] Assignee: Hitachi Maxell, Ltd., Osaka, Japan

[21] Appl. No.: 712,758

[22] Filed: Mar. 18, 1985

[30] Foreign Application Priority Data

Mar. 19, 1984 [JP] Japan ................................. 59-52769
Dec. 4, 1984 [JP] Japan ................................ 59-257164

[51] Int. Cl.⁴ ............................................. H01G 9/00
[52] U.S. Cl. ...................................... 361/433; 29/570
[58] Field of Search ............... 361/433, 301, 303, 278, 361/292; 29/570; 429/103, 218, 235

[56] References Cited

U.S. PATENT DOCUMENTS 3,536,963 10/1970 Boos ..................................... 361/433
3,758,338 9/1973 Selis et al. ........................... 429/103

Primary Examiner—Michael L. Gellner
Assistant Examiner—Douglas S. Lee
Attorney, Agent, or Firm—Birch, Stewart, Kolasch and Birch

[57] ABSTRACT

An electrical double layer capacitor containing at least one electrical double layer unit which comprises a pair of electrodes separated by a separator and positioned between a pair of collecting plates with an insulating ring being provided with around the periphery of the electrodes, wherein the electrode comprises active carbon fiber fabric carrying active carbon powder thereon, which has stable capacitance and longer discharging time due to small internal resistance.

8 Claims, 2 Drawing Figures

ELECTRICAL DOUBLE LAYER CAPACITOR AND PRODUCTION OF THE SAME

FIELD OF THE INVENTION

The present invention relates to an electrical double layer capacitor and production of the same. More particularly, it relates to an electrical double layer capacitor which is usable as a rechargeable power source and a method for the production thereof.

BACKGROUND OF THE INVENTION

An electrical double layer capacitor consists of a block containing at least two laminated units each comprising a pair of electrodes separated by a separator and positioned between a pair of collecting plates with an insulating ring being provided around the periphery of the electrodes, the block being contained between positive and negative cans. Alternatively, the capacitor may consists of one unit.

After the block is enclosed in the cans, voltage is applied to the capacitor to negatively charge the electrode on the negative can side and positively charge one on the positive can side. The thus charged capacitor can discharge for at least one month so that it is used as a power source and, after discharge, it is recharged and used as the power source again and again. Therefore, the capacitor finds application as a simple rechargeable power source of, for example, a watch.

Generally, the unit of the capacitor is produced by bonding each collecting plate to an upper insulating ring on the negative can side or to a lower insulating ring on the positive can side to form two so-called grommets, filling the cavity of each grommet with an electrode, and bonding the grommets by inserting the separator between them.

The electrode is formed in the grommet by applying a mixture of active carbon powder and an electrolytic solution on an inner wall of the collecting plate, or by compression molding the mixture in such a shape and size that it fits the shape and size of the cavity of the grommet and positioning the molded mixture in the cavity (cf. U.S. Pat. No. 3,536,963).

According to these methods, the electrode produced piece by piece by using a small amount of the electrode material results in poor productivity of the units and, in turn, the capacitor. Since the amount of active carbon powder is small, its filling density tends to fluctuate. Further, since the conventionally used active carbon powder has a comparatively small specific surface area of 1,000 to 1,500 m$^2$/g, a reaction area is insufficient so that it is difficult to increase and stabilize capacity of the capacitor.

Since the electrode produced by compression molding comprises active carbon powder and the electrolytic solution, its mechanical strength is rather poor. Therefore, it cracks or chips off during handling. This requires careful handling and results in fluctuation of capacity. This is one of the causes lowering the productivity of the capacitor.

It has been proposed to use active carbon fiber fabric as an electrode (cf. Japanese Patent Kokai Publication (unexamined) No. 99714/1980). Since the carbon fiber fabric has large specific surface areas of 2,000 to 2,500 m$^2$/g, it is expected that capacity per unit weight of the electrode is increased. Further, the carbon fiber fabric is excellent in handling and processability and has good mechanical strength. The active carbon fiber fabric has some drawbacks such that, since it is produced by carbonizing and activating fabric, its void ratio is so large that it is difficult to increase the filled amount of active carbon in the electrode. Further, contact resistance between the active carbon fiber and the collecting plate is so large that the capacity of the capacitor is hardly increased.

SUMMARY OF THE INVENTION

One object of the invention is to provide an electrical double layer capacitor with a greater capacity which fluctuates less.

Another object of the invention is to provide a method for producing an electrical double layer capacitor with good productivity.

According to the present invention, there is provided an electrical double layer capacitor containing at least one electrical double layer unit which comprises a pair of electrodes separated by a separator and positioned between a pair of collecting plates with an insulating ring being provided with around the periphery of the electrodes, wherein the electrode comprises active carbon fiber fabric carrying active carbon powder thereon.

DETAILED DESCRIPTION OF THE DRAWINGS

Figure 1:
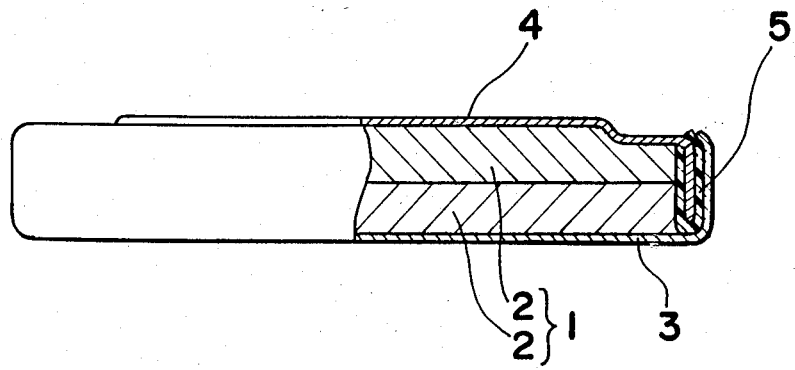
FIG. 1 is a partial cross-sectional view of the electrical double layer capacitor according to the present invention.

Referring to the drawings, FIG. 1 shows a cross section of the double layer capacitor according to the present invention, which comprises a block 1 consisting of two laminated electrical double layer units 2, 2, and is contained in a positive can 3 and a negative can 4, both made of stainless steel. An opening of the positive can 3 is closed by bending the edge of the opening over the periphery of the negative can 4 and interposing a gasket 5 made of plastics such as polypropylene therebetween so as to enclose the block 1 in the cans 3 and 4.

Figure 2:
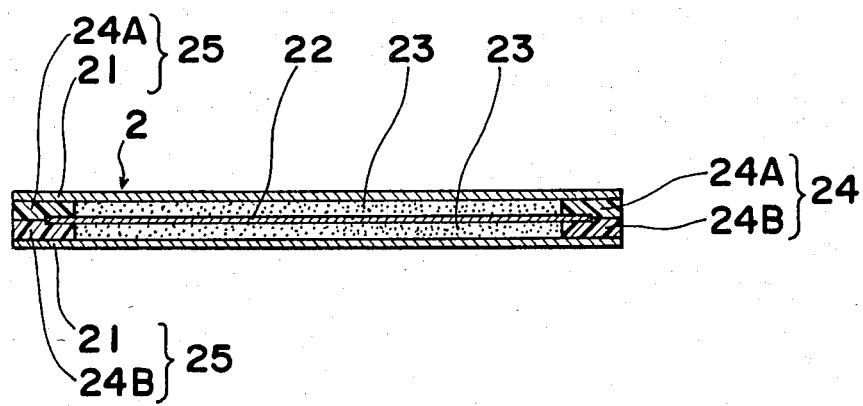
FIG. 2 is a cross-sectional view of the unit to be contained in the electrical double layer capacitor according to the present invention.

As shown in FIG. 2, the unit 2 comprises a pair of collecting plates 21, 21, a separator 22 interposed between the collecting plates 21, 21, a pair of electrodes 23, 23 positioned between the collecting plates and separated by the separator 22, and insulating rings 24A and 24B provided around the periphery of the electrodes 23, 23 so as to insulate the collecting plates 21, 21. The collecting plates, the separator and the insulating ring may be made of materials used in the conventional electrical double layer capacitor. For example, the collecting plates may be made of a film of a synthetic resin which contains a small amount of elastomeric polymer (e.g. polypropylene, etc.) and an electrically conductive material (e.g. carbon). The separator 22 may be made of a microporous polypropylene film. The insulating ring may be made of a synthetic resin or rubber (e.g. polypropylene and ethylene-propylene rubber).

The unit 2 may be produced by bonding the upper ring 24A and the lower ring 24B to the collecting plates 21, 21, respectively by ultrasonic welding or by the use of an appropriate adhesive to form two grommets 25, 25, positioning the electrodes 23, 23 in the cavities of the grommets 25, 25, respectively and then bonding two grommets by interposing the separator 22 with ultrasonic welding or by the use of appropriate adhesives. Examples of the adhesives to be used are chloroprene, silicone and epoxy resin adhesives.

In the unit 2, the electrode 23 is made of the active carbon fiber fabric carrying active carbon powder thereon. The active carbon fiber fabric is made from cotton fiber, jute fiber, regenerated cellulose fiber, polyvinyl alcohol fiber, acrylic fiber, aromatic polyamide fiber, cross-linked formaldehyde fiber, lignin fiber, phenolic fiber, petroleum pitch fiber, etc. The fiber is processed in the form of felt, mat, cloth, paper, etc., by applying an appropriate fire resisting agent to it, imparting fire resistance to the fabric at a temperature not higher than 400° C. and carbonizing and activating it at a temperature not lower than 500° C. The thus produced active carbon fiber fabric has a density of 80 to 250 g/m$^2$ and a specific surface area of 500 to 2,500 m$^2$/g, preferably 1,500 to 2,500 m$^2$/g, more preferably 2,000 to 2,500 m$^2$/g measured by the BET method.

The active carbon powder to be carried on the active carbon fiber may be particulate active carbon with a specific surface area of 1,000 to 1,500 m$^2$/g. Alternatively, the active carbon powder produced by grinding the active carbon fiber in the form of fabric or nonwoven fabric may be used as active carbon powder according to the invention. The ground fiber has the same specific surface area as that of the unground fiber, namely 500 to 2,500 m$^2$/g, most preferably 2,000 to 2,500 m$^2$/g, which contributes to the improvement of the capacity of the capacitor. Usually, the average particle size of the active carbon powder is 10 to 35 micrometers.

Usually, the electrode 23 has two basic structures. One of them comprises the active carbon fiber fabric carrying active carbon powder therethrough. The other comprises the active carbon fiber fabric and a sheet of active carbon powder which is laminated on the fabric surface facing the collecting plate in the unit.

The first structure of the electrode may be produced by impregnating the active carbon fiber fabric with a mixture of active carbon powder and the electrolytic solution (e.g. an aqueous solution of sulfuric acid), pressing it to form a sheet of appropriate thickness and punching it in the form of an electrode.

In this method, the pores of the fabric are filled with active carbon powder, which results in increase of the filling amount of the active carbon in the electrode. Since the fabric is used as a substrate, the electrode is easily produced and has good mechanical strength.

In this embodiment of the electrode, the mixture is impregnated in the fabric so that 0.1 to 0.4 mg of the powder is carried on 1 mg of the fabric.

When sulfuric acid is used as the electrolyte, it may deteriorate a punching die. To prevent this, an aqueous dispersion of active carbon powder not containing an electrolyte is used in place of the mixture of the powder and the electrolytic solution in the production of the sheet, and the electrolytic solution is preferably impregnated when the punched electrode is assembled in the unit.

The aqueous dispersion of the powder may contain a water-soluble binding agent, which improves the adhesion of the powder to the fabric and formability of the electrode. Specific examples of the water-soluble binding agent are polyvinyl alcohol, polyethylene oxide, polyacrylate, etc.

When the suspension not containing the electrolyte is used, water may be partially or completely removed by heating before the impregnated fabric is pressed to form the sheet. On the contrary, when the mixture of the powder and the electrolytic solution is used, usually water is not removed. Further, it is not necessary to add the binding agent to the mixture since the mixture easily adheres to the fabric.

In the above description, the electrolytic solution of sulfuric acid is used an the electrolyte. Any other electrolytic solutions may be used in the invention.

The second structure of the electrode may be produced by pouring the mixture of the active carbon powder and the electrolytic solution in the cavity of the grommet and placing the active carbon fiber fabric punched in the same manner as above on the mixture. Thereby, the electrolyte solution is quickly absorbed by the fabric while the carbon powder is not absorbed so much as the electrolytic solution and most of the powder remains at the bottom of the grommets, namely near the collecting plate. The powder present between the active carbon fabric and the collecting plate reduces the contact resistance and, in turn, internal resistance of the capacitor.

In the production of the second structure, the mixture contains 10 to 25% by weight of the active carbon powder and 75 to 90% by weight of the electrolytic solution. Although any electrolytic solution may be used, a 25 to 35% by weight aqueous solution of sulfuric acid is preferred.

In some cases, the powder and the fabric have a clear interface, while in other cases, a part of the powder is preferably carried in the fabric.

The present invention will be hereinafter explained in detail by following Examples, wherein parts and % are by weight.

EXAMPLE 1

Comparative Example

Used was an active carbon fiber fabric made from phenolic resin fiber and having a density of 110 g/m$^2$ and a specific surface area of 2,000 to 2,500 m$^2$/g. A mixture of active carbon powder made by grinding the same active carbon fiber and having an average particle size of 29 micrometers (1 part) and water (3 parts) were impregnated in the above fabric so that 0.2 mg of the powder was carried by 1 mg of the fabric. After removing water by heating, the impregnated fabric was pressed to form a sheet of 0.4 mm in thickness and punched to obtain a round molded article of 7.5 mm in diameter.

Two grommets were produced by ultrasonic welding a polypropylene ring of 10.0 mm in outer diameter, 7.8 mm in inner diameter and 0.3 mm in thickness on a collecting plate of 10.0 mm in diameter and 0.1 mm in thickness made of polypropylene containing a small amount of elastomeric polymer and carbon.

The molded article was positioned in the cavity of each grommet and a 30% aqueous solution of sulfuric acid (6 μl) was poured in the cavity to form an electrode. The grommets were ultrasonically welded to each other by interposing a polypropylene separator of 8.5 mm in diameter and 0.025 mm in thickness to form a unit.

Two units were laminated to form a block and were then inserted in a stainless steel negative can 10.6 mm into diameter. The opening of the negative can was capped with a stainless steel positive can 11.1 mm in inner diameter by placing therebetween a polypropylene gasket, and the edge of the positive can was inwardly bent to seal the opening to produce an electrical double layer capacitor 2.0 mm in height having a structure as shown in FIG. 2.

Capacitance of the thus produced capacitor was measured. The total amount of the carbon fiber and carbon powder filled in the unit was weighed. The results are shown in Table 1. In the Comparative Example, the electrode was made by the active carbon fiber fabric not carrying the active carbon powder.

TABLE 1

|  | Filled amount of active carbon (mg) | Capacitance (F) |
|---|---|---|
| Example 1 | 6.5 | 0.220 |
| Comparative Example | 5.4 | 0.180 |

EXAMPLE 2

Two grommets were produced in the same manner as in Example 1. An electrode was produced by pouring 8 μl of a mixture of 15% of active carbon powder and 85% of 33% aqueous solution of sulfuric acid in the cavity of the grommet and placing a punched active carbon fiber fabric of 7.5 mm in diameter and 0.4 mm in thickness so as to impregnate the fabric with the electrolytic solution. Then, the capacitor was produced in the same manner as in Example 1.

Capacitance and the total amount of the active carbon filled in the unit are shown in Table 2.

TABLE 2

|  | Filled amount of active carbon (mg) | Capacitance (F) |
|---|---|---|
| Example 2 | 6.4 | 0.26 |

What is claimed is:

1. An electrical double layer capacitor containing at least one electrical double layer unit comprising:
   a pair of electrodes separated by a separator and positioned between a pair of collecting plates with an insulting ring being provided around the periphery of said electrodes, said electrodes including an active carbon fiber fabric carrying an active carbon powder thereon wherein the active carbon fiber fabric is present on said separator side and a lyaer of the active carbon powder is present on said collecting plate side.

2. A capacitor according to claim 1, wherein the active carbon powder and the active carbon fiber fabric have a specific surface area of 1,500 to 2,500 $m^2/g$.

3. A capacitor according to claim 1, wherein the active carbon fiber fabric is in the form of cloth.

4. A capacitor according to claim 1, wherein the active carbon powder is ground active carbon fiber.

5. A method for producing an electrical double layer capacitor, comprising the steps of:
   bonding insulating rings to a pair of respective collecting plates to form two grommets,
   pouring a mixture of active carbon powder and an electrolytic solution in the cavities of the grommets,
   positioning an active carbon fiber fabric having a suitable shape and size on the mixture,
   bonding the two grommets together by interposing a separator between them to form an electrical double layer unit, and enclosing said unit in positive and negative cans.

6. A method according to claim 5, wherein the active carbon powder and the active carbon fiber fabric have a specific surface area of 1,500 to 2,500 $m^2/g$.

7. A method according to claim 5, wherein the active carbon fiber fabric is in the form of cloth.

8. A method according to claim 5, wherein the active carbon powder is ground active carbon fiber.

* * * * *